(12) United States Patent
Chen et al.

(10) Patent No.: US 8,601,466 B2
(45) Date of Patent: Dec. 3, 2013

(54) SOFTWARE DEPLOYMENT METHOD AND SYSTEM, SOFTWARE DEPLOYMENT SERVER AND USER SERVER

(75) Inventors: Zhenguo Chen, Shenzhen (CN); Hongming Yin, Shenzhen (CN); Lelin Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 990 days.

(21) Appl. No.: 12/247,351

(22) Filed: Oct. 8, 2008

(65) Prior Publication Data

US 2009/0144730 A1 Jun. 4, 2009

(30) Foreign Application Priority Data

Nov. 30, 2007 (CN) .......................... 2007 1 0195500

(51) Int. Cl.
*G06F 15/177* (2006.01)
*G06F 15/173* (2006.01)
*G06F 9/445* (2006.01)
*G06F 9/44* (2006.01)
*G06F 15/16* (2006.01)

(52) U.S. Cl.
USPC ........... 717/176; 709/223; 709/224; 709/250; 717/177; 717/178

(58) Field of Classification Search
USPC .................... 717/176; 709/220–222; 713/1–2
See application file for complete search history.

(56) References Cited

U.S. PATENT DOCUMENTS

| | | | |
|---|---|---|---|
| 6,898,702 B1 * | 5/2005 | Evans ................................ 713/2 |
| 2003/0046682 A1 * | 3/2003 | Crespo et al. ................. 717/178 |
| 2004/0267716 A1 * | 12/2004 | Prabu et al. ....................... 707/3 |
| 2005/0125509 A1 * | 6/2005 | Ramachandran ............. 709/220 |
| 2005/0216911 A1 * | 9/2005 | Yen et al. ....................... 717/176 |

(Continued)

FOREIGN PATENT DOCUMENTS

CN 101453367 B 12/2011
WO WO 2005/055072 A1 6/2005

OTHER PUBLICATIONS

"Remote Deployment Manager 4.11 Operations Guide," *IBM*, 1-228 Internet Citation http://ftp.software.ibm.com/systems/support/xyxtem_x_pdf/rdm411operationsguide.pdf [retrieved Aug. 20, 2008].

(Continued)

*Primary Examiner* — Lewis A Bullock, Jr.
*Assistant Examiner* — Keith C Yuen
(74) *Attorney, Agent, or Firm* — Leydig, Voit & Mayer, Ltd.

(57) ABSTRACT

A software deployment method creates and provides an installation parameter file for each computer to be deployed according to a software deployment task. The installation parameter file of each computer to be deployed is used to guide a network installation of software on the computer. A corresponding software deployment system, a software deployment server, and a software deployment user server are also provided. The installation parameter files are generated collectively according to the software deployment tasks, so that the computer equipment is guided by the installation parameter file to install the software automatically. Therefore, the software deployment on the computers in batches is more convenient. Moreover, as the installation parameter file corresponds to each computer to be deployed, the software type and the parameter configuration of each computer to be deployed can be adjusted flexibly, which facilitates the customization of the software.

19 Claims, 2 Drawing Sheets

(56) References Cited

U.S. PATENT DOCUMENTS

| | | | |
|---|---|---|---|
| 2005/0228903 A1* | 10/2005 | Lerner et al. | 709/250 |
| 2007/0234043 A1* | 10/2007 | Miyazawa | 713/156 |
| 2008/0034077 A1* | 2/2008 | Takashige et al. | 709/223 |
| 2008/0046708 A1* | 2/2008 | Fitzgerald et al. | 713/2 |
| 2008/0092133 A1* | 4/2008 | Mantere | 717/174 |

OTHER PUBLICATIONS

"Preboot Execution Environment (PXE) Specification Version 2.1," *Intel Corporation* (Sep. 20, 1999) Internet Citation http://pix.net/software/pxeboot/archive/pxespec.pdf [retrieved Oct. 11, 2006].

$2^{nd}$ Office Action in corresponding Chinese Application No. 200710195500.5 (Jan. 30, 2011).

European Patent Office, Examination Report in European Application No. 08163546.8 (Jul. 31, 2009).

European Patent Office, Examination Report in European Application No. 08163546.8 (Jun. 7, 2010).

Russian Patent Office, Examination Report in Russian Application No. 2008147193/08 (May 19, 2010).

Rejection Decision in corresponding European Patent Application No. 08163546.8 (May 8, 2013).

Summons to Attend Oral Proceedings in corresponding European Patent Application No. 08163546.8 (Dec. 7, 2012).

* cited by examiner

SOFTWARE DEPLOYMENT METHOD AND SYSTEM, SOFTWARE DEPLOYMENT SERVER AND USER SERVER

CROSS-REFERENCE TO RELATED APPLICATIONS

This application claims priority to Chinese Patent Application No. 200710195500.5, filed Nov. 30, 2007, entitled "Software Deployment Method and System, Software Deployment Server and User Server," which is hereby incorporated by reference in its entirety.

FIELD OF THE TECHNOLOGY

The present invention relates to computer technology field, and more particularly to a software deployment method and system, a software deployment server, and a software deployment user server.

BACKGROUND

With the informationization of industry, the application field of computer equipment has been expanding increasingly. For example, minicomputers are applicable to professional computing services, common computers are applicable to personal, home and general office environments, and blade servers are applicable to specific industrial or commercial environments. Generally, diversified computer equipment is regarded as a combination of hardware and software. Based on the application field, the corresponding software environment is designed on the computer hardware in production. As the demand for the computer equipment is increasing rapidly and continually in the market, it is often required to perform software deployment on the computer equipment in batches.

In the course of implementing the present invention, the inventor finds that in the normal process of manufacturing the computer equipment, the software deployment is usually performed on the computer equipment by means of an optical disk, which is low in efficiency and more liable to incur human error, so it is not suitable for batch operation. In addition, in the industry the software is also deployed rapidly on the computer equipment by using a mirror restoration mechanism; however, parameters of the computer software cloned through this mechanism cannot be customized, so the mirror restoration mechanism is not flexible.

SUMMARY

Accordingly, the present invention provides a software deployment method for deploying software on computer equipment in batches flexibly. The method includes the following processes. A software deployment task that includes selection information of a computer to be deployed is created. Identification information of each computer to be deployed is acquired according to the selection information of the computer to be deployed in the software deployment task. An installation parameter file of each computer to be deployed is created, and the identification information of the computer to be deployed is used as an identification of the corresponding installation parameter file, in which the installation parameter file is used to instruct the corresponding computer to be deployed to perform a network installation of software. The installation parameter file which uses the identification information of the computer to be deployed as the identification is provided to the corresponding computer to be deployed via a network.

The present invention also provides a corresponding software deployment system. The system includes: a task creation unit adapted to create a software deployment task that comprises selection information of a computer to be deployed; an identification acquisition unit is adapted to acquire identification information of each computer to be deployed according to the selection information of the computer to be deployed in the software deployment task; an installation and deployment unit is adapted to create an installation parameter file of each computer to be deployed, use the identification information of the computer to be deployed as an identification of the corresponding installation parameter file, and provide the installation parameter file to the corresponding computer to be deployed, the installation parameter file instructing an installation task of the corresponding computer to be deployed.

The present invention further provides a software deployment server. The server includes: a task acquisition unit adapted to receive a software deployment task; an identification acquisition unit adapted to acquire identification information of each computer to be deployed according to selection information of the computer to be deployed in the software deployment task; and an installation and deployment unit adapted to create an installation parameter file of each computer to be deployed, apply the identification information of the computer to be deployed as an identification of the corresponding installation parameter file, and provide the installation parameter file to the corresponding computer to be deployed, the installation parameter file being used to instruct the corresponding computer to be deployed to perform a network installation of software.

The present invention still further provides a software deployment user server. The server includes: a task creation unit adapted to create a software deployment task that comprises selection information of a computer to be deployed; and a task delivery unit adapted to deliver the software deployment task.

In the previous technical solutions, the method for creating and providing the installation parameter file for each computer to be deployed according to the software deployment task is used, and the installation parameter file of each computer to be deployed is adapted to guide the network installation of the software on the computer. As the installation parameters files are generated collectively according to the software deployment task, the computer equipment is guided by the installation parameter file to install the software automatically. Therefore, the software can be deployed on the computer equipment in batches conveniently. Moreover, as the installation parameter file corresponds to each computer to be deployed, the software type and the parameter configuration of each computer to be deployed can be adjusted flexibly, which facilitates the customization of the software.

DETAILED DESCRIPTION

In an embodiment of the present invention, a software deployment method is provided, which includes creating and providing an installation parameter file for each computer to be deployed according to a software deployment task, and using the installation parameter file of each computer to be deployed to guide the computer to perform a network installation of software. In other embodiments of the present invention, a corresponding software deployment system, a software deployment server and a software deployment user server are provided. The embodiments are illustrated in detail in the following description.

Figure 1:
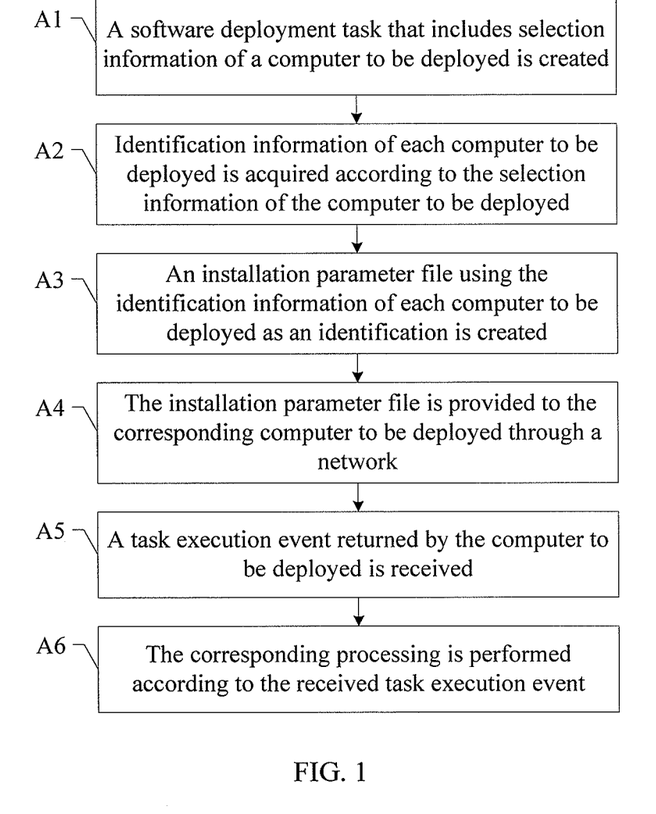
FIG. 1 is a schematic flow chart of a software deployment method according to an embodiment of the present invention.

FIG. 1 is a flow chart of a software deployment method according to an embodiment of the present invention. The method includes the following steps.

A1. A software deployment task that includes selection information of a computer to be deployed is created.

The computers to be deployed in this embodiment are generally referred to as the computer equipment on which the software needs to be installed, including, but not limited to, minicomputers, common computers, and blade servers. In the simplest situation, the software deployment task may merely include the selection information of the computer to be deployed, and the software deployment is performed according to a default software type and a parameter configuration. Certainly, a user may customize the software requiring deployment and the parameter configuration of the corresponding software. At this time, the software deployment task should include related instructional information. The selection information of the computer to be deployed, the instruction on the software requiring deployment, and the instruction on the parameter configuration of the corresponding software of the user may be acquired through a man-machine interface between the computer to be deployed and the user.

To facilitate the customization of the software deployment task, a task template can be provided to the user to simplify operations of the user. The task template is an aggregation by combining many kinds of the software according to a different application environment of the computer to be deployed. One kind of the task template includes the common software and the basic parameter configuration in the application, and the user only needs to make some modifications to the template to customize the software deployment task for the computer to be deployed.

After confirming the software requiring deployment by each computer to be deployed and its detailed parameter configuration, a parameter response file associated with the computer to be deployed and the software is created. The parameter response file is a description file used to automatically respond to the parameter configuration required by the installation in the software installation. In this situation, the created software deployment task may include the selection information of the computer to be deployed, and the instructional information on the software requiring deployment and the instructional information on the parameter response file of the corresponding software which is associated with the computer to be deployed. Certainly, the parameter response file may not be created when the software deployment task is created, but is created in the case of the software deployment task is executed. In this situation, the created software deployment task may include the selection information of the computers to be deployed, and the instructional information on the software requiring deployment and the instructional information on the parameter configuration of the corresponding software which are associated with the computers to be deployed.

A2. Identification information of each computer to be deployed is acquired according to the selection information of the computer to be deployed in the software deployment task.

In this embodiment, the identification information of the computer to be deployed is the identification information that may be identified by the computer to be deployed, so that the computer to be deployed can search the installation parameter file identified by the information and corresponding to its own. A network card address, that is, a Media Access Control (MAC) address, of the computer to be deployed may be selected as the identification information of the computer to be deployed. Certainly, other identification information that makes a computer to be deployed different from others in a deployment scope may be selected as the identification information as well.

Based on management mode for different types of the computers to be deployed, the network card address of the computer to be deployed can be acquired in the following different manners.

I. For the computer equipment of which the management mode is not automatic, such as the common computers, the network card addresses of the computers may be directly used as the selection information, and the user selects the computers to be deployed according to the network card addresses. In this situation, the network card address of the computer to be deployed may be acquired according to the selection information of the computer to be deployed in the deployment task.

Or, the selection information of the computer to be deployed can be mapped to the network card address, which is listed in the table below.

| Asset Number | Network Card MAC Address | Physical Identification of the Computer |
|---|---|---|
| 3105091402 | 00-e0-fc-71-82-91 | F12-7A-198S |
| 3105091403 | 00-e0-fc-71-82-92 | F12-7A-199S |
| 3105091404 | 00-e0-fc-71-82-93 | F12-7A-200S |

The asset number or the physical identification of the computer is used as the selection information. When the user selects a computer to be deployed according to the asset number or the physical identification of the computer, the network card address of the computer to be deployed is acquired according to the mapping relation between the selection information and the network card address, and the selection information may be the asset number, the physical identification and so on.

II. For the computer equipment of which the management mode is automatic, such as the blade servers based on a blade server in the Advanced Telecom Computing Technology (ATCA), the management identification for the automatic management of the computer may be used as the selection information. For example, a shelf identification and a slot number of the blade server based on the blade server in the ATCA are used as the management identification, and the blade server based on the blade server in the ATCA is selected according to the shelf identification and the slot number. In this situation, the network card address of the computer to be deployed can be acquired in the following manners.

(1) A report parameter file named with the network segment address is created. The network segment address is the Internet Protocol (IP) address segment for performing dynamic address allocation on the computers to be deployed.

The report parameter file is a configuration file for guiding the computer to be deployed to return its identification information. Usually, in a computer network, the Dynamic Host Configuration Protocol (DHCP) is adopted for network management and for allocating the dynamic IP address to the computer equipment in the network. Here, the network segment address is the IP address segment managed by the DHCP service. The detailed method for naming the returned parameter file with the address segment is to name the returned parameter file with all of or a frontal part of the string of the address segment which is expressed with the hexadecimal expression form and deleted the "." delimiter, for example, the name is "C0A8001", "C0A800", "C0A80", "C0A8", "C0A", "C0", or "C".

This naming method is realized based on a load mode of the configuration file when the computer equipment boots from the network in a Preboot Execution Environment (PXE). The booting process includes the following steps.

a. Search for the configuration file named with the own network card address. If the configuration file is found, the configuration file is executed; if the configuration file is not found, a step b is executed.

b. Search for the configuration file named with the IP address or the frontal part of the IP address allocated for itself by the DHCP. For example, if the allocated IP address is 192.168.0.22, then search for the configuration file named C0A80016 (C0A80016 is the hexadecimal expression of the IP address 192.168.0.22) first. If the configuration file named C0A80016 is not found, then search for the configuration file named C0A80016→C0A8001→C0A800→C0A80→C0A8→C0A→C0→C in order. If the configuration file is found, the configuration file is executed; if the configuration file is not found, step c is executed.

c. Search for and execute the default configuration file.

As the report parameter file may be provided to each computer to be deployed in the network to use, the configuration file may be named with the network segment address or the frontal part of the network segment address, so that the computer to the deployed in the network can find the configuration file. Certainly, if a plurality of the report parameter files is created, the corresponding report parameter file can also be named with the IP address concretely allocated to the computer to be deployed.

(2) The management identification of the computer to be deployed is acquired according to the selection information of the computer to be deployed.

The management identification is the identification which can perform an automatic management on the computer to be deployed, for example, the shelf identification and the slot number of the blade servers of the blade server in the ATCA. The user can select the computer to be deployed by directly using the management identification. Certainly, the user can also acquire the management identification through the saved mapping relation between the selection information and the management identification.

(3) The computer to be deployed is booted from the network according to the management identification, and the report parameter file is loaded into the computer to be deployed through the network.

A management module of the computer to be deployed is adapted to power on, power off, or reset the computer to be deployed having the specific management identification, and to control the computer to be deployed boot from the network.

According to the network boot process in the PXE, as the configuration file named with the network card address of the computer to be deployed does not exist at this time, the computer to be deployed will search for and load the report parameter file named with the network segment address, and perform the return registration to give feedback of its hardware information, such as the network card address.

(4) A returned registration message is received after the report parameter file is executed by the computer to be deployed.

The mode in which the computer to be deployed performs the return registration can be plighted through the report parameter file. When an external message is received, the message type is acquired by parsing the message header to perform the corresponding process.

(5) The network card address of the computer to be deployed is acquired from the registration message.

A3. An installation parameter file of each computer to be deployed is created. The created installation parameter file is used to instruct the corresponding computer to be deployed to perform the network installation of the software. The identification information of each computer to be deployed serves as the identification of the corresponding installation parameter file.

The installation parameter file is the configuration file for guiding the corresponding computer to be deployed to perform the network installation of software. Based on the general mode of the software installation, that is, a software source is operated, and the parameter configuration needed in the installation is provided according to the requirements of the software in the procedure of operating the software source. Therefore, the installation parameter file may include the instruction on the software source of the software requiring deployment and the instruction on the parameter response file of the corresponding software. If the parameter response file is created in the step of creating the software deployment task, the path of the parameter response file is instructed in the installation parameter file directly. If the software deployment task includes the instruction on the parameter configuration of the corresponding software, the parameter response file needs to be created first, and then the path of the parameter response file is instructed in the installation parameter file.

The parameter response file can be created according to a response template file in the software source. The response template file can be achieved through a secondary development of the software source for the automatic deployment, and describes the parameters needed to provide in the installation of the corresponding software according to certain specifications. In addition, the software source based on the secondary development may further include a software source description file, which provides attribute information of the software source. Thus, the equipment for managing and providing software resources can automatically manage the resources of the software source according to the software source descriptive information when searching the software source directory. The equipment for managing and providing the software resources is adapted to provide a software installation source shared on the network to the computer to be deployed. The equipment can be combined with the equipment for executing the deployment task or be installed independently. Furthermore, a control file source for the software installation can be added in the software source according to the certain specifications, so that when operating the software source, the computer to be deployed can report a corresponding task execution event and receive relevant process control according to the control file source.

Based on the network boot process in the PXE, the corresponding installation parameter file can be named with the acquired network card address of each computer to be deployed, so that the computer to be deployed can load the file through the network boot conveniently.

A4. The installation parameter file using the identification information of the computer to be deployed as an identification is provided to the corresponding computer to be deployed through a network.

As the identification information that can be identified by the computer to be deployed is used as the identification of the installation parameter file, the computer to be deployed can search for and load the installation parameter file corresponding to itself through the network so as to execute the software deployment task according to the installation parameter file.

In particular, if the installation parameter file is named with the network card address of the computer to be deployed, based on the network boot process in the PXE, the installation parameter file can be loaded by booting the computer to be deployed from the network. In this situation, the computer equipment of which the management mode is not automatic, such as the common computers, can be reset and rebooted manually. The computer equipment of which the management mode is automatic, such as the blade servers of the blade server in the ATCA, can be powered on, powered off, and reset by accessing its management module according to the management identification (for example, the shelf identification and the slot number).

If the software source installed on the computer to be deployed includes the control file source, the computer to be deployed will generate and return a task execution event during the software installation. At this time, the software deployment method of this embodiment further includes the following steps.

A5. A task execution event returned by the computer to be deployed is received.

Based on the control mode used concretely by the software source, the task execution event returned from the computer to be deployed during the installation can be classified into various types, for example, a key event such as a software installation start event, an installation completion event, and an installation failure event.

A6. The corresponding processing is performed according to the received task execution event.

The detailed processing method may include the following steps.

(1) The execution progress of the software deployment task is updated. The user can view the execution progress of the software deployment task in the form of a progress bar or a percentage on the man-machine interface. If the equipment providing the man-machine interface and the equipment executing the software deployment task are different entities, the equipment executing the software deployment task can make records after receiving the task execution event returned by the computer to be deployed, for example, can write the records into the local running logs and database, and then forward the records to the equipment providing the man-machine interface or notify the equipment to update the progress.

(2) The task process of the corresponding computer to be deployed is controlled.

Different control content can be set according to the type of the task execution event. For example, if the task execution event is a software deployment completion event (the last software installation completion event returned by the computer to be deployed can be regarded as the software deployment completion event), the control operations to be performed are described as follows.

a. The installation parameter file of the corresponding computer to be deployed is modified as a link file for linking to the default parameter file that is booted locally according to the received software deployment completion event.

b. The computer to be deployed is booted from the network, and the modified installation parameter file is loaded into the computer to be deployed through the network.

After the previous operations, based on the network boot process in the PXE, after completing their own software deployment task, the computers to be deployed can be normally booted locally.

In addition, in order to control the execution process of the software deployment task flexibly, the user can set the interaction mode of the software deployment task when creating the software deployment task. Through the previous method, the processing mode of the task execution event returned by the computer to be deployed may be selected in the course of the execution of the software deployment task according to the setting interaction mode. The task execution modes include but are not limited to the following.

(1) Interaction: The control instruction to the task execution event is received, and the task process of the corresponding computer to be deployed is controlled according to the control instruction. In this mode, when the task execution event which for example indicates installation starting of a kind of software, installation ending of a kind of software, or installation failure of a kind of software returned by the computer to be deployed is received, the next control operation, for example, termination, reinstallation, uninstallation, and roll back and so on must be performed according to the control instruction delivered by the user. Thus, the task execution is controllable and can be intervened.

(2) Non-interaction: The task process of the corresponding computer to be deployed is controlled according to the preconfigured processing mode corresponding to the task execution event. In this mode, after the task execution event returned by the computer to be deployed is received, it is unnecessary to wait for the control instruction from the user, and perform the processing according to the preconfigured mode. For example, for the installation failure event, the operation of uninstallation, roll back, or termination is performed according to predefined error processing mode. Certainly, in the case of non-interaction, the execution progress of the software deployment task can be updated according to the task execution event returned by the computer to be deployed, so that the user can know the current status of the software deployment.

In addition to the above interaction modes, other interaction modes related to the types of the task execution event can be configured. For example, interaction after success refers to as waiting for the control instruction from the user after receiving the software installation completion event and the processing mode to the error event such as the failure event is in the same manner of the non-interaction. Interaction after failure refers to as waiting for the control instruction from the user after receiving error event such as the software installation failure event.

Moreover, in order to make the execution of the created software deployment task more flexible and controllable, the user can set the execution mode of the software deployment task when creating the software deployment task. After the software deployment task is created, the subsequent process of executing the software deployment task is triggered according to the setting execution mode. The task execution modes include but are not limited to the following.

(1) Immediate execution: The execution of the software deployment task is triggered immediately after the software deployment task is created. In this embodiment, the immediate execution is expressed as triggering the operation for acquiring the identification information of the computers to be deployed. If the software deployment task is created and executed by different equipment, the trigger operation may be implemented by delivering the created software deployment task to the execution equipment.

(2) Manual execution: The execution of the software deployment task is triggered according to the execution instruction received from the user after the software deployment task is created.

(3) Timing execution: The execution of the software deployment task is triggered after a setting time interval after the software deployment task is created.

Moreover, many kinds of software are required to input license information to verify validity of the software in installation. Therefore, the license of the software may be managed as a resource, that is, the license is automatically allocated to the software when customizing the deployment task, and the allocated license is recovered when the task is cancelled or when the software installation fails, so as to deploy the software rapidly in batches. In this embodiment, the software license is allocated when the parameter response file is created, and the license is put into the parameter response file as a special parameter. The detailed process of using and managing the license is described as follows.

(1) When the parameter response file of the corresponding software is created, the license is allocated for the software from the license resource.

(2) The parameter response file that includes the instruction on the parameter configuration of the corresponding software and the allocated license is created.

(3) After providing the installation parameter file to the corresponding computer to be deployed, the software installation failure event returned by the computer to be deployed is received.

(4) The license of the corresponding software is recovered into the license resource according to the received software installation failure event.

In the previous embodiment, the method for creating and providing the installation parameter file for each computer to be deployed according to the software deployment task is used, and the installation parameter file of each computer to be deployed is adapted to guide the network installation of the software. As the installation parameter files are generated collectively according to the software deployment task, and the computer equipment is guided by the installation parameter file to install the software automatically, the software can be deployed on the computer equipment in batches conveniently. Furthermore, as the installation parameter file corresponds to each computer to be deployed, the software type and parameter configuration of each computer to be deployed can be adjusted flexibly, which facilitates the software customization.

The software deployment system, the software deployment server, and the software deployment user server corresponding to the method of the previous embodiment are illustrated in detail below.

Figure 2:
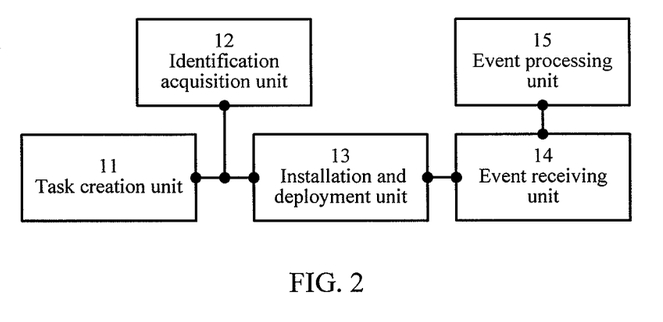
FIG. 2 is a schematic view of a logic structure of a software deployment system according to an embodiment of the present invention.

FIG. 2 is a schematic view of a logic structure of a software deployment system according to an embodiment of the present invention. The software deployment system is adapted to perform the software deployment method of the previous embodiment. Units of the system can be located in the same physical entity, and the detailed structure of the system includes a task creation unit 11, an identification acquisition unit 12, and an installation and deployment unit 13.

The task creation unit 11 is adapted to create a software deployment task that includes selection information of computers to be deployed.

The identification acquisition unit 12 is adapted to acquire identification information of each computer to be deployed according to the selection information of the computer to be deployed in the software deployment task provided by the task creation unit 11.

The installation and deployment unit 13 is adapted to create an installation parameter file of each computer to be deployed according to the software deployment task provided by the task creation unit 11. The installation parameter file instruct an installation task of the corresponding computer to be deployed, and use the identification information of the computer to be deployed provided by the identification acquisition unit 12 as the identification of the corresponding installation parameter file. The installation parameter file is provided to the corresponding computer to be deployed.

The software deployment system of this embodiment can further include an event receiving unit 14 and an event processing unit 15.

The event receiving unit 14 is adapted to receive a task execution event returned by the computer to be deployed.

The event processing unit 15 is adapted to update an execution progress of the software deployment task according to the task execution events received by the event receiving unit 14, and/or control a task process of the corresponding computer to be deployed according to the task execution event.

Figure 3:
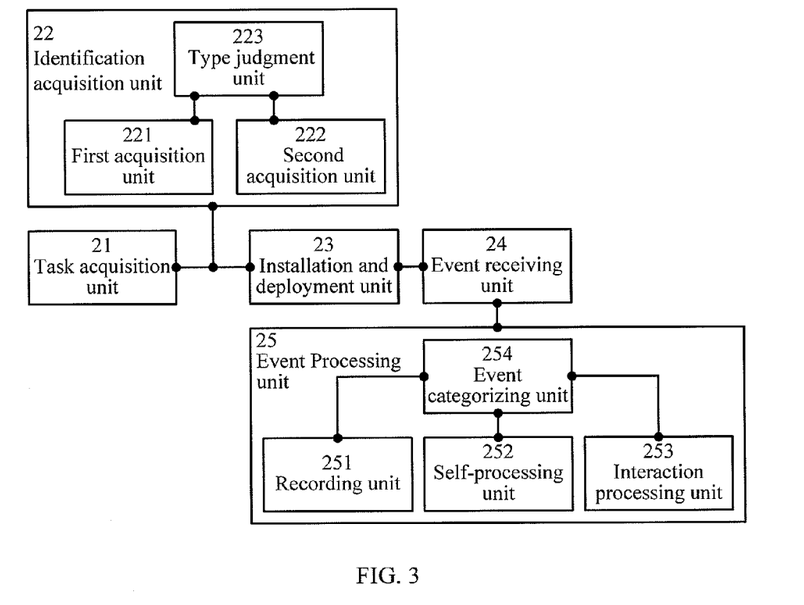
FIG. 3 is a schematic view of a logic structure of a software deployment server according to an embodiment of the present invention.

FIG. 3 is a schematic view of a logic structure of a software deployment server according to an embodiment of the present invention. The software deployment server can be used as the equipment for executing the software deployment task according to the method of the previous embodiment. The detailed structure of the software deployment server includes a task acquisition unit 21, an identification acquisition unit 22, and an installation and deployment unit 23:

The task acquisition unit 21 is adapted to receive a software deployment task.

The identification acquisition unit 22 is adapted to acquire identification information of each computer to be deployed according to selection information of the computer to be deployed in the software deployment task received by the task acquisition unit 21. The identification acquisition unit 22 may include a first acquisition unit 221, a second acquisition unit 222, and a type judgment unit 223.

The first acquisition unit 221 is adapted to use a network card address representing the selection information of the computer to be deployed in the software deployment task received by the task acquisition unit 21 as the identification information of the corresponding computer to be deployed.

The second acquisition unit 222 is adapted to create a report parameter file named with a network segment address which is an IP address segment used for performing dynamic address allocation on the computer to be deployed, boot the computer to be deployed from a network according to management identification representing the selection information of the computer to be deployed in the software deployment task received by the task acquisition unit 21, load the report parameter file into the computer to be deployed through the network, receive a registration message returned after the computer to be deployed execute the report parameter file, and acquire the network card address of the computer to be deployed from the registration message.

The type judgment unit 223 is adapted to select to trigger the first acquisition unit 221 or the second acquisition unit 222 according to whether the selection information of the computer to be deployed in the software deployment task received by the task acquisition unit 21 is represented as the network card address of the computer to be deployed;

The installation and deployment unit 23 is adapted to create an installation parameter file of each computer to be deployed according to the software deployment task received by the task acquisition unit 21. The installation parameter file is used to instruct the corresponding computer to be deployed to perform the network installation of the software, and use the identification information of the computer to be deployed provided by the identification acquisition unit 22 as the identification of the corresponding installation parameter file. The installation parameter file is provided to the corresponding computer to be deployed.

The software deployment server of this embodiment may further include an event receiving unit 24, and an event processing unit 25.

The event receiving unit 24 is adapted to receive a task execution event returned by the computer to be deployed.

The event processing unit 25 is adapted to record and forward the task execution event acquired by the event receiving unit 24, and/or control a task process of the corresponding computer to be deployed according to the task execution event. The event processing unit 25 may include a recording unit 251, a self-processing unit 252, an interaction processing unit 253, and an event categorizing unit 254.

The recording unit 251 is adapted to record and forward the task execution event.

The self-processing unit 252 is adapted to control the task process of the corresponding computer to be deployed according to a preset processing mode corresponding to the task processing event.

The interaction processing unit 253 is adapted to report the task execution event and control the task process of the corresponding computer to be deployed according to the returned control instruction.

The event categorizing unit 254 is adapted to select to trigger the recording unit 251, the self-processing unit 252, or the interaction processing unit 253 according to a type of the task execution event and an interaction mode set by the software deployment task.

Figure 4:
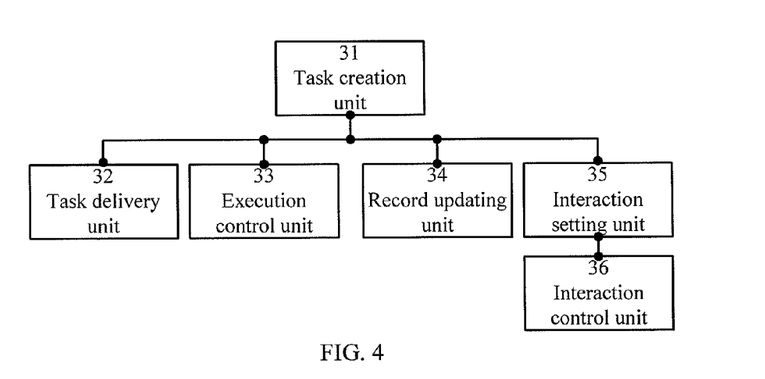
FIG. 4 is a schematic view of a logic structure of a software deployment user server according to an embodiment of the present invention.

FIG. 4 is a schematic view of a logic structure of a software deployment user server according to an embodiment of the present invention. The software deployment user server can be used as the equipment for providing a man-machine interface according to the method of the previous embodiment. The detailed structure of the software deployment user server may include a task creation unit 31 and a task delivery unit 32.

The task creation unit 31 is adapted to create a software deployment task that includes selection information of computers to be deployed.

The task delivery unit 32 is adapted to deliver the software deployment task created by the task creation unit 31.

The software deployment user server of this embodiment may further include an execution control unit 33. The execution control unit 33 is adapted to set an execution mode of the software deployment task created by the task creation unit 31, and trigger the task delivery unit 32 to deliver the created software deployment task according to the execution mode.

The software deployment user server of this embodiment may further include a record updating unit 34, an interaction setting unit 35, and an interaction control unit 36.

The record updating unit 34 is adapted to receive a record of a task execution event, and update an execution progress of the software deployment task created by the task creation unit 31 according to the record of the task execution event.

The interaction setting unit 35 is adapted to set an interaction mode for the software deployment task created by the task creation unit 31.

The interaction control unit 36 is adapted to receive the task execution event reported according to the interaction mode set by the interaction setting unit 35, receive a control instruction to the task execution event, and deliver the control instruction as a feedback on the reported task execution event.

To make the previous embodiments more understandable, a detailed application process in which the software deployment server and the software deployment user server are used to implement the software deployment method of the previous embodiments is described in the following.

It is assumed that the computers to be deployed include the blade servers based on an ATCA computer frame and the common computers that are not managed using the automatic mode, and assumed that the computers to be deployed use the network card MAC addresses as the identification information. The software deployment procedure is as follows.

1) A user customizes a software deployment task through the software deployment user server for providing a man-machine interface. This step includes the following:

(1) The user selects the common computers to be deployed according to the asset numbers, and selects the blade servers to be deployed according to the shelf identifications and the slot numbers;

(2) The user uses a task template for office automation provided by the software deployment user server, and customizes software deployment tasks for the selected normal computers. The task template includes software such as Windows, Office, and AutoCAD;

(3) The user uses a task template for a telecommunication solution provided by the software deployment user server, and customizes software deployment tasks for the selected blade servers. The task template includes software such as Linux, DB2, and VCS;

(4) The software deployment user server creates parameter response files according to response template files of the software and in accordance with parameters in the task template customized by the user;

(5) The software deployment user server creates the software deployment tasks, in which the deployment tasks of the normal computers are identified by the acquired network card addresses according to the asset numbers selected by the user, and the deployment tasks of the blade servers are identified by the shelf identifications and the slot numbers.

2) The software deployment user server delivers the software deployment tasks to the software deployment server in a preset execution mode.

3) After receiving external requests from the software deployment user server, the software deployment server parses the message headers and determines that the messages are task messages. Then, the software deployment server receives and verifies the software deployment tasks, and initializes the installation environment of its own, for example, deletes the original installation parameter files.

4) The software deployment server performs different processing according to different identifications used by the deployment tasks.

I. The deployment tasks identified by the network card MAC addresses 4.1.1) The software deployment server directly generates the installation parameter files of the common computers to be deployed according to the MAC addresses.

4.1.2) The user manually reboots the common computers to be deployed, and searches for the installation parameter files named with the MAC addresses on the software deployment server according to the order of loading configuration files during booting. If the installation parameter files exist, the installation parameter files are loaded and parsed, the instructed software sources are connected, and the software installation are started according to the instructed parameter response files.

II. The deployment task identified by the shelf identifications and the slot numbers 4.2.1) The software deployment server creates report parameter files named with the network segment addresses, and resets and reboots the blade servers to be deployed according to the shelf identifications and the slot numbers through management modules of the blade servers.

4.2.2) The blade servers to be deployed boot from the network after resetting, and search for the installation parameter files named with the MAC addresses on the software deployment server according to the order of loading configuration files during booting. At this time the installation parameter files do not exist, the searching fails; then the blade servers search for the report parameter files named with the network segment addresses; if the report parameter files exist, the report parameter files are loaded and parsed, registration information such as the MAC addresses are collected, and response registrations to the software deployment server are applied for.

4.2.3) After receiving external requests from the blade servers to be deployed, the software deployment server parses the message headers, determines that the messages are registration messages, and acquires the MAC addresses of the blade servers.

4.2.4) The software deployment server generates installation parameter files of the blade servers to be deployed according to the MAC addresses of the return registration, and resets and reboots the blade servers to be deployed through management modules.

4.2.5) The blade servers to be deployed boot from the network after resetting, and search for the installation parameter files named with the MAC addresses on the software deployment server according to the order of loading the configuration files during booting. If the installation parameter files exist, the installation parameter files are loaded and parsed, the corresponding software sources are connected, and the software installation are started according to the instructed parameter response files.

It should be noted that if the shelf identifications and the slot numbers are not specially limited during booting in steps 4.2.1 and 4.2.4, it is possible that not all of the managed blade servers have customized the software deployment tasks. For the single-chip computers without tasks, the server can generate link files linking to a default parameter file that is booted locally according to the returned MAC addresses. Thus, after rebooting in step 4.2.4, the blade servers without tasks can enter the local system normally.

5) The single-chip computers and the common computers to be deployed return progress messages carrying task execution events to the software deployment server during software installation.

6) After receiving the external requests from the computers to be deployed, the software deployment server parses the message headers, determines that the messages are progress messages, and acquires the task execution events; the software deployment server writes the task execution events into the database and the system running log, and forwards the records of the task execution tasks to the software deployment user server, or notifies the software deployment user server to refresh the progress information; in addition, according to the interaction mode setting of the deployment tasks, the software deployment server reports the task execution events that need to wait for the control instructions to the software deployment user server.

7) The software deployment user server displays the records of the task execution events provided by the software deployment server to the user in the from of a progress bar or percentage; in addition, the software deployment user server provides the task execution events that need to wait for the control instructions reported by the software deployment server to the user, receives the control instructions from the user, and delivers the control instructions to the software deployment server.

8) After receiving the external requests from the software deployment user server, the software deployment server parses the message headers, determines that the messages are control messages carrying the control instructions, and performs task interventions with the installation processes of the computers to be deployed according to the control messages.

9) The blade servers and the common computers to be deployed return software deployment completion events to the software deployment server after all the software installation are completed.

10) The software deployment server modifies the installation parameter file of the corresponding computer to be deployed to the link file linking to the default parameter file that is booted locally according to the received software deployment completion event; then, the software deployment server reboots the blade servers to be deployed through the management modules, and the user manually reboots the common computers to be deployed.

11) The blade servers and the common computers to be deployed load and parse the default parameter files after rebooting, and boot from the local hard disks normally.

It is known from the previous embodiments that in the embodiments of the present invention, the method of creating and providing the installation parameter files to the computers to be deployed according to the software deployment tasks is used, and the installation parameter file of each computer to be deployed is adapted to guide the computer to perform the network installation of software. As the installation parameter files are generated collectively according to the software deployment tasks, the computer equipment can be guided by the installation parameter files to automatically install the software. Therefore, the software can be deployed on the computer equipment in batches conveniently. Moreover, as the installation parameter file corresponds to each computer to be deployed, the software type and the parameter configuration of each computer to be deployed can be adjusted flexibly, which facilitates the software customization.

The software deployment method, the corresponding software deployment system, the software deployment server, and the software deployment user server provided by the embodiments of the present invention are illustrated in detail. In the present invention, concrete examples are given to illustrate the principle and implementation modes of the present invention. The explanation of the previous embodiments helps to understand the method and the core ideas of the present invention. The ordinary skilled persons in the art can make some modifications or variations to the embodiments and application scopes without departing from the spirit of the present invention. Therefore, the specification should not be construed as limitation to the present invention.

What is claimed is:

1. A software deployment method comprising:
creating a software deployment task that comprises selection information of a server blade to be deployed, wherein the server blade is based on a blade server in the Advanced Telecom Computing Technology (ATCA), management identification for the server blade comprises the selection information, and the selection information is a shelf identification and a slot number of the server blade to be deployed;
acquiring a Media Access Control (MAC) address of the server blade to be deployed according to the shelf identification and the slot number of the server blade to be deployed in the software deployment task, wherein, the MAC address of the server blade to be deployed is obtained from a registration message of the server blade which executes a report parameter file and is booted from a network according to the shelf identification and the slot number of the server blade to be deployed;
creating an installation parameter file of the server blade to be deployed, and using the MAC address of the server blade to be deployed as an identification of the installation parameter file, wherein the installation parameter file is used to instruct the server blade to be deployed to perform a network installation of software; and
providing the installation parameter file which uses the MAC address of the server blade to be deployed as the identification to the corresponding server blade to be deployed via a network, so that the server blade to be deployed can search for and load the installation parameter file through the network to execute the software deployment task according to the installation parameter file.

2. The software deployment method as claimed in claim 1, wherein:
the providing the installation parameter file to the server blade to be deployed comprises booting the server blade to be deployed from the network, and loading the installation parameter file into the server blade to be deployed through the network.

3. The software deployment method as claimed in claim 2, wherein:
the acquiring the MAC address of the server blade to be deployed comprises:
creating the report parameter file named with a network segment address which is an interact protocol address segment used for performing dynamic address allocation on the server blade to be deployed;
acquiring the management identification of the server blade to be deployed according to the selection information of the server blade to be deployed;
booting the server blade to be deployed from the network according to the management identification, and loading the report parameter file into the server blade to be deployed through the network; and
receiving a registration message of the server blade to be deployed which executes the report parameter file, and carries the MAC address of the server blade to be deployed.

4. The software deployment method as claimed in claim 1, further comprising:
receiving a task execution event returned by the server blade to be deployed; and
updating an execution progress of the software deployment task according to the task execution event, and/or controlling a task process of the corresponding server blade to be deployed according to the task execution event.

5. The software deployment method as claimed in claim 4, wherein:
the method further comprises setting an interaction mode of the software deployment task;
the controlling the task process of the corresponding server blade to be deployed according to the task execution event comprises:
according to the interaction mode:
controlling the task process of the corresponding server blade to be deployed according to a preset processing mode corresponding to the task execution event; or
receiving a control instruction on the task execution event, and controlling the task process of the corresponding server blade to be deployed according to the control instruction.

6. The software deployment method as claimed in claim 4, wherein:
the task execution event comprises a software deployment completion event;
the controlling the task process of the corresponding server blade to be deployed according to the task execution event comprises:
modifying the installation parameter file of the corresponding server blade to be deployed as a link file linking to a default parameter file that is booted locally according to the received software deployment completion event;
booting the server blade to be deployed from the network, and loading the modified installation parameter file into the server blade to be deployed through the network.

7. The software deployment method as claimed in claim 1, wherein:
the software deployment task further comprises an instruction on the software requiring deployment and an instruction on a parameter response file of the corresponding software which are associated with the server blade to be deployed; and
the process of creating the installation parameter file of each server blade to be deployed comprises: creating the installation parameter file of each server blade to be deployed according to the software deployment task; and the installation parameter file comprises an instruction on a software source of the software requiring deployment and an instruction on the parameter response file of the corresponding software which is associated with the server blade to be deployed.

8. The software deployment method as claimed in claim 7, further comprising:
acquiring the selection information of the server blade to be deployed, and the instruction on the software requiring deployment and the instruction on a parameter configuration of the corresponding software which is associated with the server blade to be deployed; and
creating the parameter response file of the corresponding software according to the instruction on the parameter configuration of the corresponding software.

9. The software deployment method as claimed in claim 7, wherein:
the process of creating the parameter response file of the corresponding software comprises:
allocating a license to the corresponding software from a license resource; and
creating the parameter response file comprising the instruction on the parameter configuration of the corresponding software and the license;

the software deployment method further comprises:
receiving the task execution event returned by the server blade to be deployed, wherein the task execution event comprises a software installation failure event; and
recovering the license of the corresponding software to the license resource according to the received software installation failure event.

10. The software deployment method as claimed in claim 1, wherein:
the software deployment task further comprises an instruction on the software requiring deployment and an instruction on a parameter configuration of the corresponding software which is associated with the server blade to be deployed;
the process of creating the installation parameter file of each server blade to be deployed comprises:
creating a parameter response file of the corresponding software according to the instruction on the parameter configuration of the corresponding software; and
creating the installation parameter file of each server blade to be deployed according to the instruction on the software requiring deployment in the software deployment task; wherein the installation parameter file comprises an instruction on the software source of the software requiring deployment and an instruction on the parameter response file of the corresponding software which is associated with the server blade to be deployed.

11. The software deployment method as claimed in claim 10, wherein:
the process of creating the parameter response file of the corresponding software according to the instruction on the parameter configuration of the corresponding software comprises:
allocating a license to the corresponding software from a license resource; and
creating the parameter response file comprising the instruction on the parameter configuration of the corresponding software and the license;
the software deployment method further comprises:
receiving the task execution event returned by the server blade to be deployed, wherein the task execution event comprises a software installation failure event; and
recovering the license of the corresponding software to the license resource according to the received software installation failure event.

12. The software deployment method as claimed in claim 1, further comprising:
setting an execution mode of the software deployment task; and
triggering the process of acquiring identification information of the server blade to be deployed according to the execution mode.

13. The software deployment method as claimed in claim 12, wherein:
the execution mode is an immediate execution, and process of triggering is triggering the process of acquiring identification information of the server blade to be deployed; or
the execution mode is a manual execution, and the process of triggering is triggering the process of acquiring identification information of the server blade to be deployed according to a received execution instruction after creating the software deployment task; or
the execution mode is a timing execution, and the process of triggering is triggering the process of acquiring identification information of the server blade to be deployed after creating the software deployment task and after a setting time interval.

14. A software deployment system, comprising a tangible non-transient computer-readable medium and a processor for executing instructions stored on the computer-readable medium, the computer-readable medium further comprising:
a task creation unit comprising computer-executable instructions that, when executed, create a software deployment task that comprises selection information of a computer to be deployed, wherein the computer to be deployed is a server blade based on a blade server in the Advanced Telecom Computing Technology (ATCA), and management identification of the server blade comprises the selection information, and the selection information is a shelf identification and a slot number of a server blade;
an identification acquisition unit comprising computer-executable instructions that, when executed, acquire a Media Access Control (MAC) address of the server blade to be deployed according to the shelf identification and the slot number of the server blade to be deployed in the software deployment task, wherein-the MAC address of the server blade to be deployed is obtained from a registration message of the server blade which executes a report parameter file and is booted from a network according to the shelf identification and the slot number of the server blade to be deployed; and
an installation and deployment unit comprising computer-executable instructions that, when executed, create an installation parameter file of the server blade to be deployed, using the MAC address of the server blade to be deployed as an identification of a corresponding installation parameter file, and provide the installation parameter file which uses the MAC address-of the server blade to be deployed as the identification to the corresponding server blade to be deployed, wherein the installation parameter file instructs an installation task of the corresponding server blade to be deployed, so that the server blade to be deployed can search for and load the installation parameter file through the network to execute the software deployment task according to the installation parameter file.

15. The software deployment system as claimed in claim 14, further comprising:
an event receiving unit comprising computer-executable instructions that, when executed, receive a task execution event returned by the computer to be deployed; and
an event processing unit comprising computer-executable instructions that, when executed, update an execution progress of the software deployment task according to the task execution event, and/or control a task process of the corresponding server blade to be deployed according to the task execution event.

16. A software deployment server, comprising a tangible non-transient computer-readable medium and a processor for executing instructions stored on the computer-readable medium, the computer-readable medium further comprising:
a task acquisition unit comprising computer-executable instructions that, when executed, receive a software deployment task that comprises selection information of a computer to be deployed, wherein the computer to be deployed is a server blade based on a blade server in the Advanced Telecom Computing Technology (ATCA), and management identification of the server blade includes the selection information, and the selection information is a shelf identification and a slot number of a server blade;

an identification acquisition unit comprising computer-executable instructions that, when executed, acquire a Media Access Control (MAC) address of the server blade to be deployed according to the shelf identification and the slot number of the server blade of the computer to be deployed in the software deployment task, wherein, the MAC address of the server blade to be deployed is obtained from a registration message of the server blade which executes a report parameter file and is booted from a network according to the shelf identification and the slot number of the server blade to be deployed; and an installation and deployment unit comprising computer-executable instructions that, when executed, create an installation parameter file of the server blade to be deployed, use the MAC address of the server blade to be deployed as an identification of the installation parameter file, and provide the installation parameter file which uses the MAC address-of the server blade to be deployed as the identification to the server blade to be deployed, wherein the installation parameter file instructs an installation task of the corresponding computer to be deployed, so that the server blade to be deployed can search for and load the installation parameter file through the network to execute the software deployment task according to the installation parameter file.

17. The software deployment server as claimed in claim 16, wherein the identification acquisition unit comprises:

a first acquisition unit comprising computer-executable instructions that, when executed, use a network card address representing the selection information of the server blade to be deployed in the software deployment task as the identification information of the corresponding server blade to be deployed;

a second acquisition unit comprising computer-executable instructions that, when executed, create a report parameter file named with a network segment address which is an internet protocol address segment used for performing dynamic address allocation on the server blade to be deployed, boot the server blade to be deployed from a network according to a management identification used for representing the selection information of the server blade to be deployed in the software deployment task, load the report parameter file into the server blade to be deployed through the network, receive a registration message returned by the server blade to be deployed after the server blade to be deployed executes the report parameter file, and acquire the network card address of the server blade to be deployed from the registration message; and a type judgment unit comprising computer-executable instructions that, when executed, select to trigger the first acquisition unit or the second acquisition unit according to whether the selection information of the server blade to be deployed in the software deployment task is expressed as the network card address of the server blade to be deployed.

18. The software deployment server as claimed in claim 16, further comprising:

an event receiving unit comprising computer-executable instructions that, when executed, receive a task execution event returned by the server blade to be deployed; and an event processing unit comprising computer-executable instructions that, when executed, record and forward the task execution event, and/or control a task process of the corresponding computer to be deployed according to the task execution event.

19. The software deployment server as claimed in claim 18, wherein:

the software deployment task received by the task acquisition unit is set with an interaction mode;

the event processing unit comprises:

a recording unit comprising computer-executable instructions that, when executed, record the task execution event, and provide the task execution event to a software deployment user server;

a self-processing unit comprising computer-executable instructions that, when executed, control the task process of the corresponding server blade to be deployed according to a preset processing mode corresponding to the task execution event;

an interaction processing unit comprising computer-executable instructions that, when executed, report the task execution event, and control the task process of the corresponding server blade to be deployed according to a returned control instruction; and an event categorizing unit comprising computer-executable instructions that, when executed, select to trigger the recording unit, the self-processing unit, and the interaction processing unit according to the type of the task execution event and the interaction mode set in the software deployment task.

\* \* \* \* \*

UNITED STATES PATENT AND TRADEMARK OFFICE
CERTIFICATE OF CORRECTION

| | | |
|---|---|---|
| PATENT NO. | : 8,601,466 B2 | Page 1 of 1 |
| APPLICATION NO. | : 12/247351 | |
| DATED | : December 3, 2013 | |
| INVENTOR(S) | : Chen et al. | |

It is certified that error appears in the above-identified patent and that said Letters Patent is hereby corrected as shown below:

In the Claims

Column 15, Claim 3, line 46 "an interact protocol" should read --an internet protocol--.

Signed and Sealed this
Twenty-fifth Day of March, 2014

Michelle K. Lee
*Deputy Director of the United States Patent and Trademark Office*